(12) United States Patent
Paczkowski et al.

(10) Patent No.: US 7,899,037 B1
(45) Date of Patent: Mar. 1, 2011

(54) VOICE SESSION AND DATA SESSION COORDINATION IN A COMMUNICATION DEVICE

(75) Inventors: Lyle Walter Paczkowski, Mission Hills, KS (US); Charles D. Todd, Parkville, MO (US); Pallavur Sankaranaraynan, Overland Park, KS (US); Brian D. Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 157 days.

(21) Appl. No.: 12/399,255

(22) Filed: Mar. 6, 2009

(51) Int. Cl.
 *H04L 12/66* (2006.01)
(52) U.S. Cl. .................... 370/352; 370/395.21
(58) Field of Classification Search ............ 370/211, 370/352, 392, 329, 395; 455/435, 437
See application file for complete search history.

(56) References Cited

U.S. PATENT DOCUMENTS

| | | | |
|---|---|---|---|
| 6,112,084 A | 8/2000 | Sicher et al. | |
| 6,404,873 B1 * | 6/2002 | Beyda et al. | 379/202.01 |
| 7,072,344 B2 * | 7/2006 | Abdelilah et al. | 370/395.21 |
| 7,088,816 B2 * | 8/2006 | Donnelly | 379/373.01 |
| 7,092,370 B2 * | 8/2006 | Jiang et al. | 370/329 |
| 7,574,212 B2 * | 8/2009 | McConnell et al. | 455/437 |
| 2002/0111167 A1 * | 8/2002 | Nguyen et al. | 455/435 |
| 2005/0249196 A1 * | 11/2005 | Ansari et al. | 370/352 |
| 2006/0221939 A1 | 10/2006 | Rosen et al. | |
| 2006/0227754 A1 | 10/2006 | Ko | |
| 2006/0291452 A1 * | 12/2006 | Velagaleti et al. | 370/352 |
| 2007/0165640 A1 * | 7/2007 | Fitchett et al. | 370/392 |
| 2007/0248221 A1 * | 10/2007 | Chatterjee et al. | 379/211.02 |
| 2009/0028132 A1 * | 1/2009 | Portman et al. | 370/352 |

\* cited by examiner

*Primary Examiner*—Thong H Vu

(57) ABSTRACT

A communication device has a data application and a voice application. The device establishes a data session between the data application and a data system. During the data session, the device receives a voice session request from a voice communication system, and in response, alerts the user of the request and transfers a voice session request indication from the voice application to the data application. The device receives user acceptance of the voice session request, and in response, transfers a voice session acceptance indication from the voice application to the data application. In response to the voice session indications, the device transfers a data session message from the data application to the data system and then transfers a ready indication from the data application to the voice application. In response to the ready indication, the communication device then transfers a voice session acceptance from the voice application to the voice communication system.

20 Claims, 5 Drawing Sheets

VOICE SESSION AND DATA SESSION COORDINATION IN A COMMUNICATION DEVICE

TECHNICAL BACKGROUND

Some communication devices provide both voice and data communication capability. For example, a single communication device may download videos from the Internet and also place voice telephony calls. In some cases, this voice and data communication capability cannot be used simultaneously. In other examples, an incoming voice call may interrupt the ability to effectively participate in a data session. For example, the user may not want to play an expensive video game over a data link while talking with someone over a voice link.

OVERVIEW

A communication device has a data application and a voice application. The communication device establishes a data session between the data application and a data communication system. During the data session, the communication device receives a voice session request from a voice communication system into the voice application. In response to the voice session request, the communication device alerts the user of the voice session request and transfers a voice session request indication from the voice application to the data application. The communication device receives a user acceptance of the voice session request, and in response to the user acceptance, transfers a voice session acceptance indication from the voice application to the data application. In response to the voice session request indication and the voice session acceptance indication, the communication device transfers a data session message from the data application to the data communication system. In response to transferring the data session message, the communication device transfers a data application ready indication from the data application to the voice application. In response to both the user acceptance and the data application ready indication, the communication device transfers a voice session acceptance from the voice application to the voice communication system.

DETAILED DESCRIPTION

Figure 1:
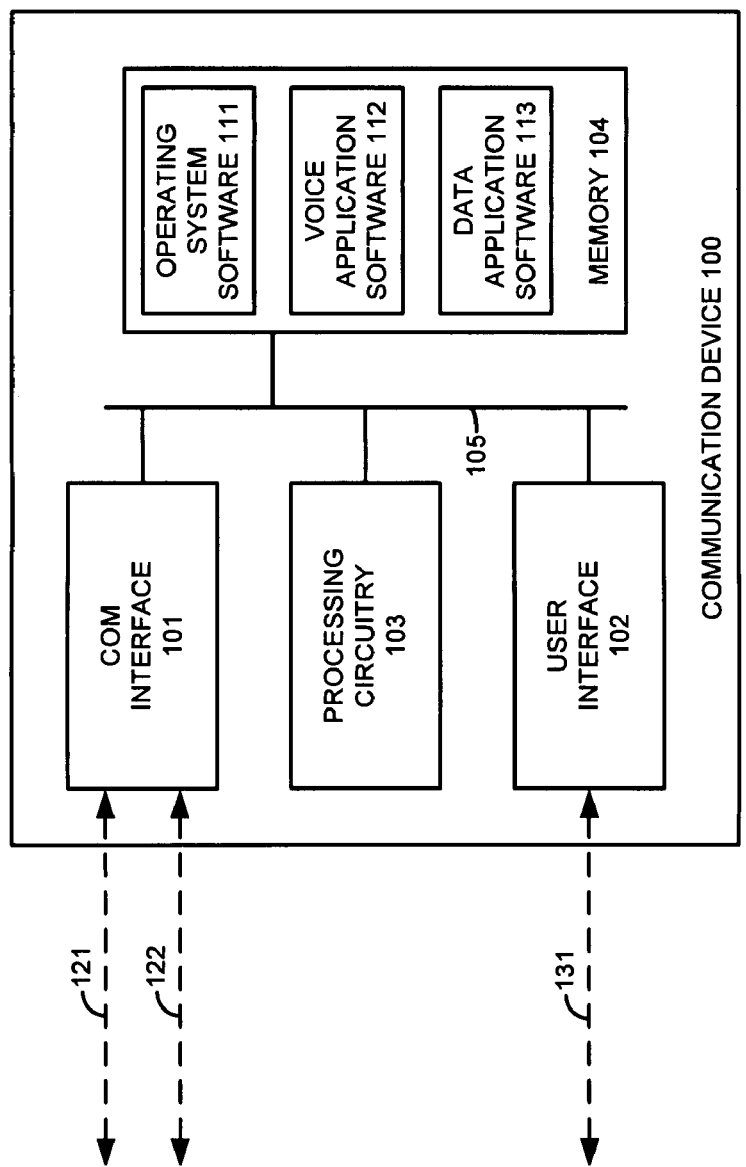
FIG. 1 illustrates a communication device.

FIG. 1 illustrates communication device 100. Communication device 100 comprises communication interface 101, user interface 102, processing circuitry 103, memory 104, and connections 105. Memory 104 stores operating system software 111, voice application software 112, and data application software 113. Processing circuitry 103 communicates with interfaces 101-102 and memory 104 over connections 105.

Communication device 100 typically includes other well-known components, such as a power supply and a plastic enclosure, that are not shown for the sake of clarity. Wireless communication device 101 may be a telephone, computer, Internet appliance, game console, wireless transceiver, or some other communication apparatus—including combinations thereof.

Communication interface 101 comprises components that communicate over communication links 121-122 under the control of processing circuitry 103. Communication interface 101 includes a port, modem, network card, radio frequency transceiver, antenna, processing circuitry, communication software, or some other communication device—including combinations thereof.

Communication link 121 comprises a voice link, and communication link 122 comprises a data link. Communication links 121-122 may each include a signaling channel and a bearer channel, or links 121-122 may share a signaling channel. Communication links 121-122 use metal, glass, air, space, or some other signal propagation media. Communication links 121-122 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), High Speed Packet Access (HSPA), Wireless Fidelity (WIFI), Time Division Multiplex (TDM), Internet Protocol (IP), Ethernet, optical networking, or some other communication format—including combinations thereof.

User interface 102 comprises components that exchange user information 131 with a user under the control of processing circuitry 103. User interface 102 may include a speaker, microphone, buttons, lights, display screen, touch screen, touch pad, mouse, scroll wheel, or some other user input/output apparatus—including combinations thereof.

Processing circuitry 103 comprises microprocessor and other circuitry that retrieves and executes software 111-113 from memory 104 to control communication interface 101 and user interface 102. Memory 104 comprises a disk drive, flash drive, integrated circuitry, or some other memory device—including combinations thereof. Software 111-113 comprises computer programs, firmware, or some other form of machine-readable processing instructions.

When executed by processing circuitry 103, software 111-113 directs processing circuitry 103 to operate communication device 100 as described herein. Note that processing circuitry 103 executes voice application software 112 to provide a voice application—the ability to transfer and/or receive voice communications for the user. Likewise, processing circuitry 103 executes data application software 113 to provide a data application—the ability to transfer and/or receive data for the user.

Figure 2:
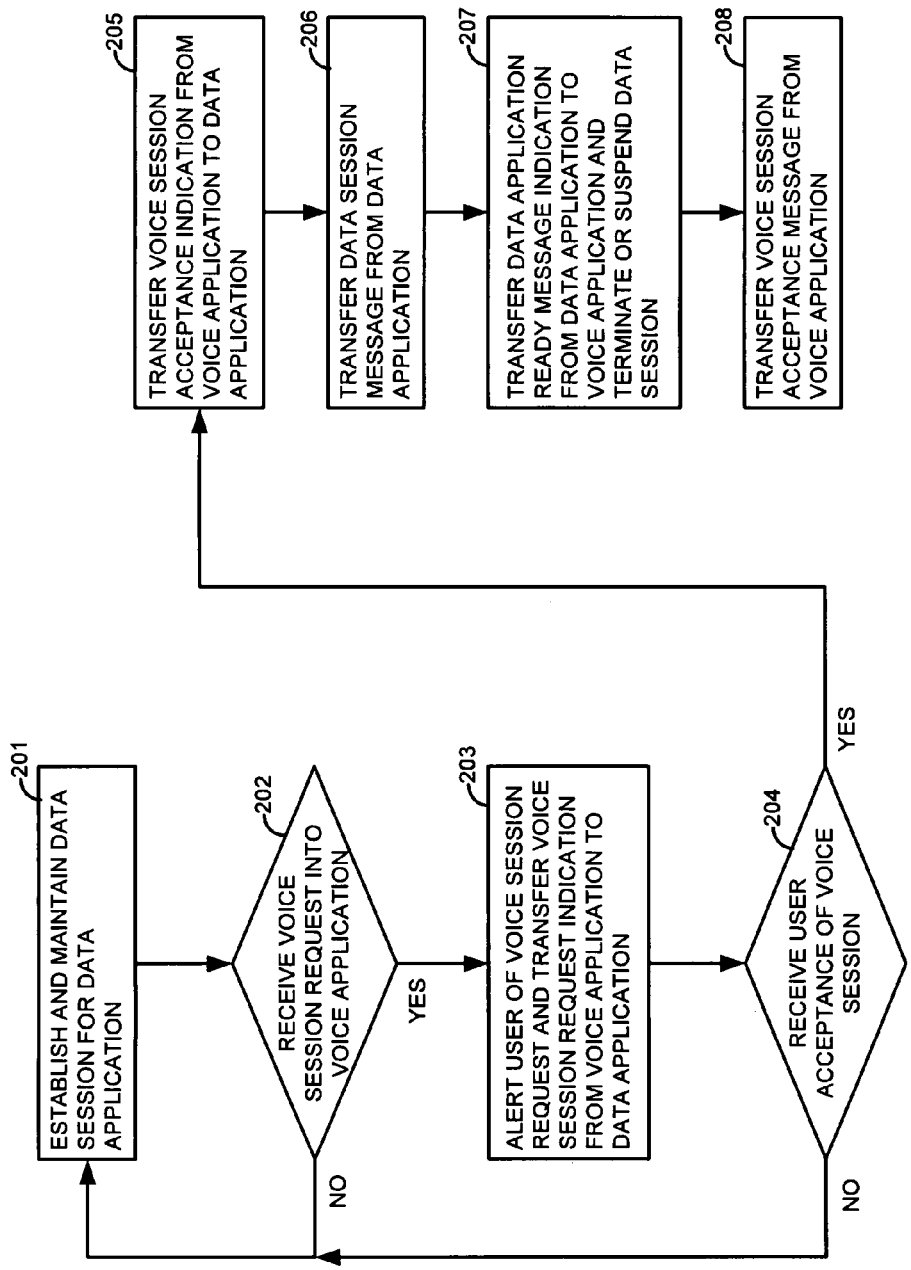
FIG. 2 illustrates the operation of the communication device.

FIG. 2 illustrates the operation of communication device 100. Prior to the operations depicted on FIG. 2, communication device 100 is powered up and processing circuitry 103 retrieves and executes software 111-113 to control the operation as follows. Communication device 100 establishes a data session between the data application and an external data communication system over data link 122 (201)—possibly in response to user input. The data session could be a video download, e-mail session, web site interaction, video game, or some other data transfer.

During the data session, communication device 100 may receive a voice session request from an external voice communication system over voice link 121 into the voice application (202). The voice session request could be a Session Initiation Protocol (SIP) message, CDMA page, or some other voice session signaling message. In response to the voice session request (202), communication device 100 alerts the user of the voice session request (203), and the voice application transfers a voice session request indication to the data application (203). The user alert could be a message display, tone, vibration, light, or some other user notification.

Communication device 100 may receive a user acceptance of the voice session request (204). For example, the user may press a touch-screen "answer" icon. In response to a user acceptance (204), the voice application transfers a voice session acceptance indication to the data application (205). In response to the voice session request indication (202) and the voice session acceptance indication (204), the data session transfers a data session message to an external data communication system (206) over data link 122. The data session message could include application data, status data, a suspension request, a termination request, or some other session-related information. In some examples, the data application begins to identify data session information for the session message in response to the voice session request indication, and then in response to the voice session acceptance indication, the data application transfers the identified information in the session message.

In response to transferring the data session message (206), the data application transfers a data application ready indication to the voice application (207), and the data application also suspends or terminates the data session (207). In response to both the user acceptance (204) and the data application ready indication (207), the voice application transfers a voice session acceptance to the external voice communication system over voice link 121 (208). The voice session acceptance could be a SIP message, CDMA page, or some other voice session signaling message.

Note that the coordination between the data and voice applications allows the data application to transfer the session message before data session interruption due to the impending voice session. Also note that the voice application may transfer the voice session acceptance to the external voice communication system after the data application ready indication is received or after a set period of time elapses after the voice application has received the user voice session acceptance—whichever occurs first. Thus, the voice application still transfers the voice session acceptance to the external voice communication system in response to the data application ready indication, if the data application provides the ready indication in a timely manner.

Figure 3:
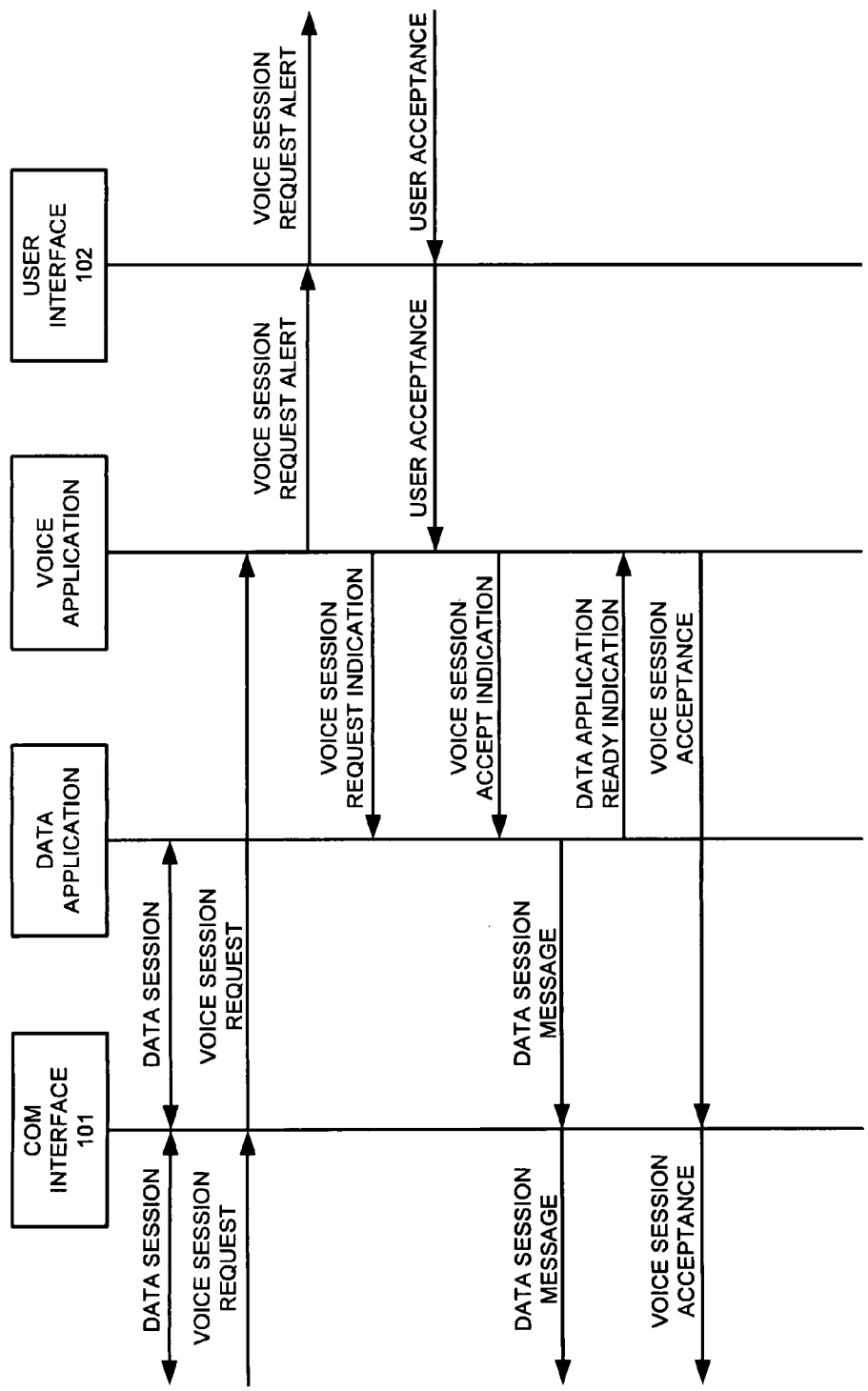
FIG. 3 illustrates the operation of the communication device.

FIG. 3 also illustrates the operation of communication device 100. Note that the operations illustrated in FIGS. 2-3 may differ in various examples. The data application establishes a data session through communication interface 101 over data link 122. The data session could be a video download, e-mail session, web site interaction, video game, or some other data transfer. During the data session, the voice application receives a voice session request message through communication interface 101 over voice link 121. The voice session request message could be a SIP message, CDMA page, or some other call set-up message.

In response to the voice session request message, the voice application alerts the user of the voice session request through user interface 102. The user alert could be a message display, tone, vibration, light, or some other user notification. The voice application also transfers a voice session request indication to the data application. This request indication allows the data application to begin preparations for the potential interruption of the data session by the voice session. For example, the data application may begin to identify information for a data session message that enables an orderly suspension and subsequent re-activation of the data session.

The voice application receives a user acceptance of the voice session request through user interface 102. For example, the user may press an "answer" key. In response to the user acceptance, the voice application transfers a voice session acceptance indication to the data application. Note that the voice application has not yet transferred a voice session acceptance message to the external voice communication system, and thus, this acceptance indication triggers the data application to transfer the session message prior to external acceptance of the voice session and interruption of the data session. In response to the voice session acceptance indication, the data session transfers a data session message through communication interface 101 over data link 122. The data session message could include application data, status data, a suspension request, a termination request, or some other session-related information.

In response to transferring the data session message, the data application transfers a data application ready indication to the voice application. This indication allows the voice application to externally accept the voice session after the data application has transferred the data session message. Typically, the data application also suspends or terminates the data session at this point, but that is not required in all examples. In response to both the user acceptance and the data application ready indication, the voice application transfers a voice session acceptance message to the external voice communication system through communication interface 101 over voice link 121. The voice session acceptance message could be a SIP message, CDMA page, or some other call set-up message.

Note that the coordination between the data and voice applications allows the data application to transfer the session message before session interruption due to an impending voice session. Also note that the voice application may transfer the voice session acceptance message to the external voice communication system after the data application ready indication is received or after a set period of time elapses after the voice application has received the user voice session acceptance—whichever occurs first. Thus, the voice application still transfers the voice session acceptance message to the external voice communication system in response to the data application ready indication, if the data application provides the ready indication in a timely manner.

Figure 4:
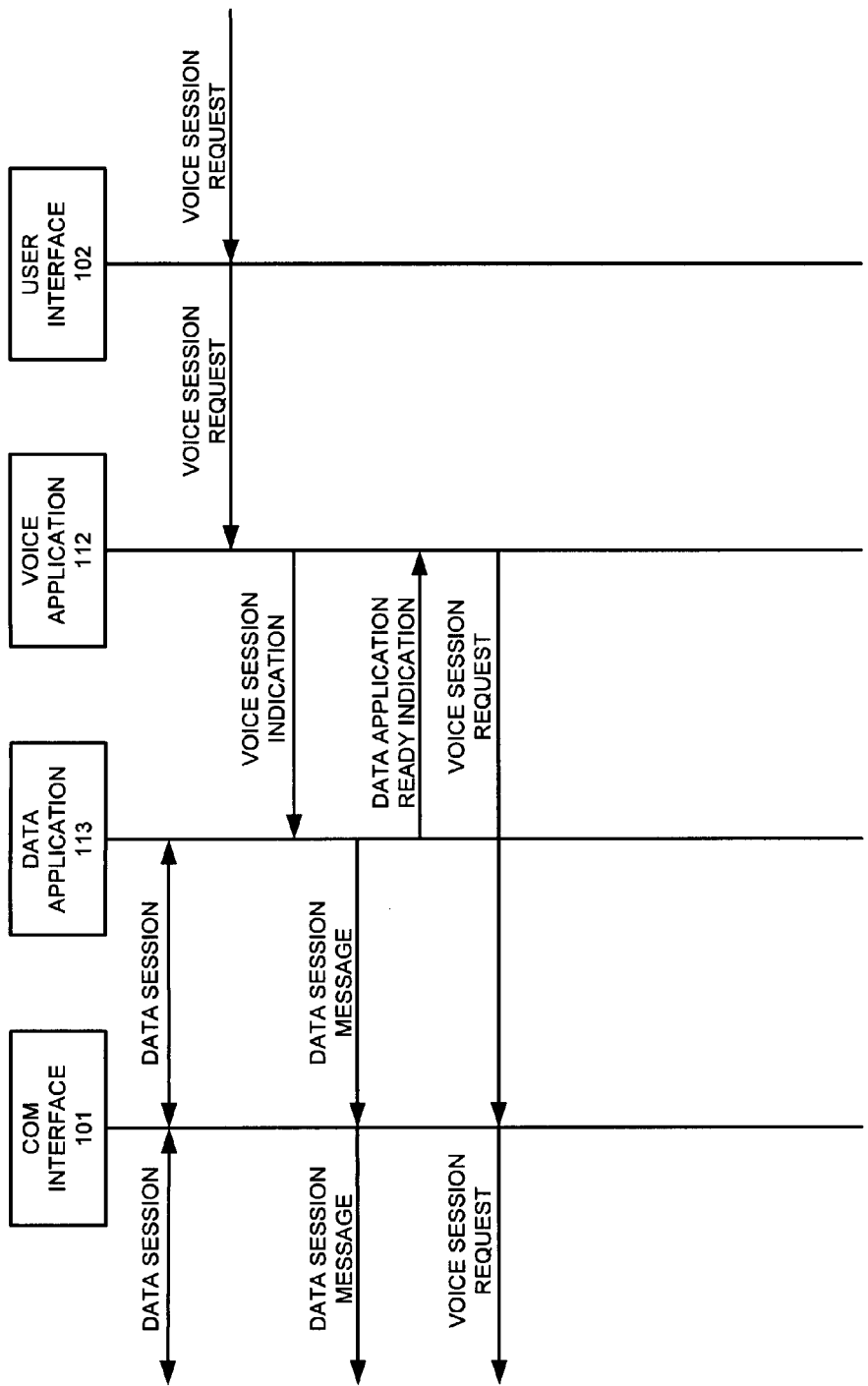
FIG. 4 illustrates the operation of the communication device.

FIG. 4 also illustrates the operation of communication device 100, although the operation depicted on FIG. 4 could be omitted in some examples. The data application establishes a data session through communication interface 101 over data link 122. The data session could be a video download, e-mail session, web site interaction, video game, or some other data transfer. During the data session, the voice application receives a voice session request through user interface 102. The voice session request could be a touch screen entry, voice command, key input, or some other user instruction.

In response to the voice session request, the voice application transfers a voice session indication to the data application. This indication allows the data application to prepare for the impending interruption of the data session by the voice session. In response to the voice session indication, the data session transfers a data session message through communication interface 101 over data link 122. The data session message could include application data, status data, a suspension request, a termination request, or some other session-related information.

In response to transferring the data session message, the data application transfers a data application ready indication to the voice application. This indication allows the voice application to externally request the voice session after the data application has transferred the data session message. Typically, the data application also suspends or terminates the data session at this point, but that is not required in all examples. In response to both the user request and the data application ready indication, the voice application transfers a voice session request message to the external voice communication system through communication interface 101 over voice link 121. Note that the coordination between the data and voice applications allows the data application to transfer the session message before session interruption due to an impending voice session.

Note that the voice application may transfer the voice session request message to the external voice communication system after the data application ready indication is received or after a set period of time elapses after the voice application has received the user voice session request—whichever occurs first. Thus, the voice application still transfers the voice session request message to the external voice communication system in response to the data application ready indication, if the data application provides the ready indication in a timely manner.

Figure 5:
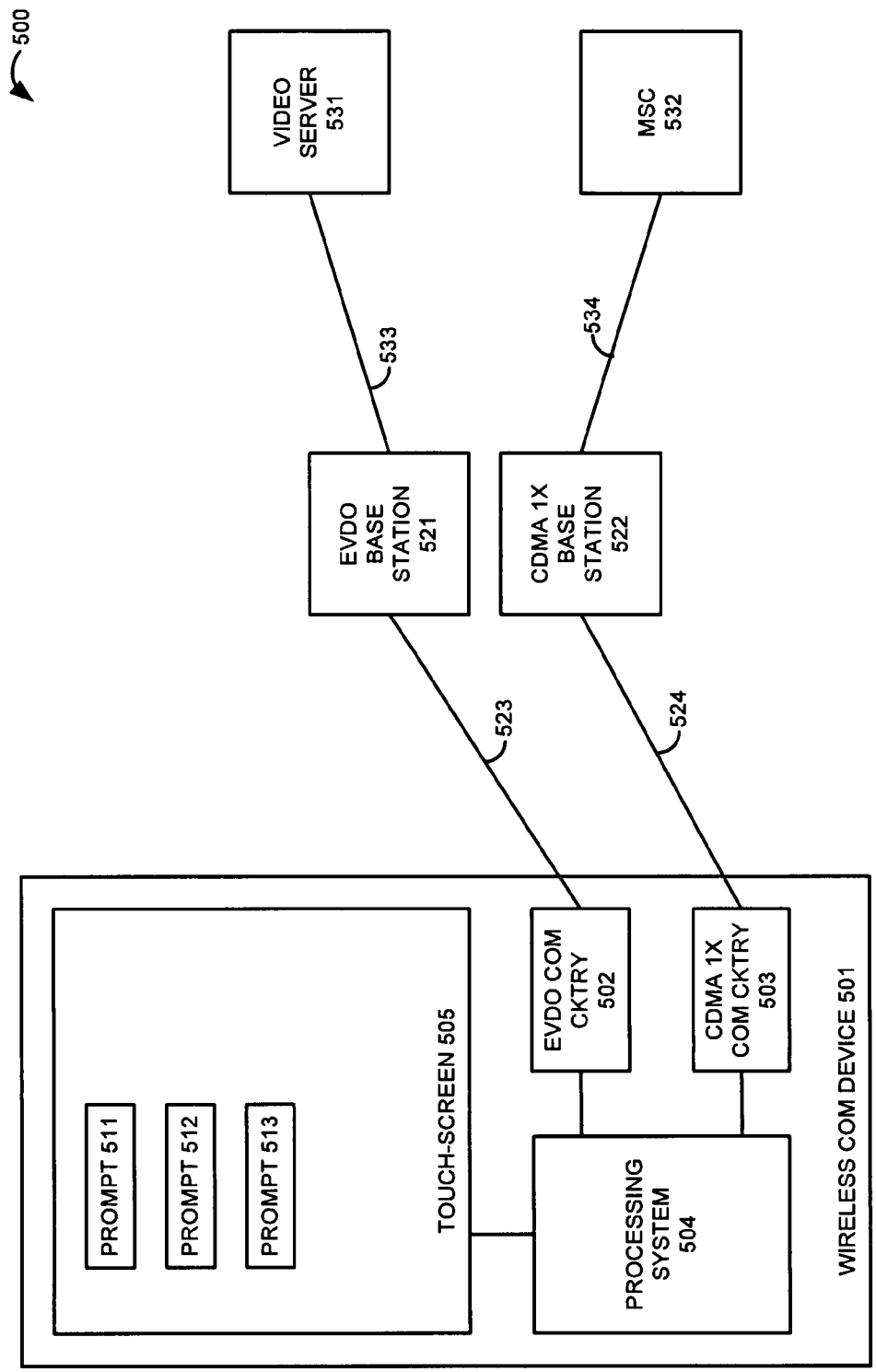
FIG. 5 illustrates a communication system and its operation.

FIG. 5 illustrates communication system 500 and its operation. Communication system 500 comprises wireless communication device 501, EVDO base station 521, CDMA 1x base station 522, video server 531, Mobile Switching Center (MSC) 532, wireless EVDO link 523, wireless CDMA 1x link 524, and communication links 533-534. Wireless communication device 501 comprises EVDO communication circuitry 502, CDMA 1x communication circuitry 503, processing system 504, and touch-screen 505.

Wireless communication device 501 may be a telephone, computer, digital assistant, Internet appliance, game console, or some other user device with wireless communication capability—including combinations thereof. Circuitry 502-503 each comprises radio frequency circuitry, signal processing circuitry, software, an antenna, and possibly other communication components. Circuitry 502-503 may share some components, but they form separate physical communication interfaces. Processing system 504 comprises microprocessor circuitry, a circuitry board, a memory apparatus that stores software, and possibly other components. The microprocessor circuitry retrieves the software from the memory apparatus to provide a voice telephony application and a video data application. Wireless communication device 501 typically includes other well-known components, such as microphone, speaker, buttons, lights, power supply, and enclosure, that are not shown for the sake of clarity.

EVDO communication circuitry 502 communicates with EVDO base station 521 over wireless EVDO link 523. CDMA 1x communication circuitry 503 communicates with CDMA 1x base station 522 over wireless CDMA 1x link 524. Video server 531 communicates with EVDO base station 521 over communication link 533. MSC 532 communicates with CDMA 1x base station 522 over communication link 534. Communication links 533-534 could use various combinations of signal propagation media and communication protocols. Communication links 533-534 could be direct links or they may include various intermediate components, systems, and networks.

In operation, the video data application establishes a video data session with video server 531 over EVDO communication circuitry 502, wireless EVDO link 523, EVDO base station 521, and communication link 533. For the video data session, video server 531 transfers video content to wireless communication device 501 for presentation to the user on touch screen 505. During the video data session, the voice telephony application receives a voice session request message from MSC 532 over communication link 534, CDMA 1x base station 522, wireless CDMA 1x link 524, and CDMA 1x communication circuitry 503. In response to the voice session request message, the voice telephony application alerts the user of the requested voice session by presenting prompts 511-513 on touch screen 505, in addition to other possible notifications, such as tones or vibrations. Prompt 511 reads: "Ignore call from Cindy." Prompt 512 reads: "Suspend video session and answer call from Cindy." Prompt 513 reads: "Terminate video session and answer call from Cindy." The user touches the desired prompt on touch screen 505.

If prompt 511 is touched, then the incoming voice session is not accepted, prompts 511-513 are cleared from touch screen 505, and the video data session continues.

If prompt 512 is selected, the voice telephony application transfers a voice session acceptance indication to the video data application with an instruction to temporarily suspend the video data session. The video data application transfers a session message to video server 531 to suspend the video session over EVDO communication circuitry 502, wireless EVDO link 523, EVDO base station 521, and communication link 533. The video data application then transfers a ready indication to the voice telephony application. In response to the ready indication, the voice telephony application transfers a voice session acceptance message to MSC 532 over CDMA 1x communication circuitry 503, wireless CDMA 1x link 524, CDMA 1x base station 522, and communication link 534. The video data session is suspended and the voice session commences. The data application (or the voice application) then presents a prompt (not shown) on touch screen 505 that reads: "Resume video." If the user touches this prompt, then the video data application transfers a message to video server 531 to resume the video session from the point it was suspended, and the video transfer and display resumes. The voice telephony application would also terminate the voice session if that has not already been done.

If prompt 513 is selected, the voice telephony application transfers a voice session acceptance indication to the video data application with an instruction to terminate the video data session. The video data application transfers a session message to video server 531 to terminate the video data session over EVDO communication circuitry 502, wireless EVDO link 523, EVDO base station 521, and communication link 533. The video data application then transfers a ready indication to the voice telephony application. In response to the ready indication, the voice telephony application transfers a voice session acceptance message to MSC 532 over CDMA 1x communication circuitry 503, wireless CDMA 1x link 524, CDMA 1x base station 522, and communication link 534. The video data session is terminated and the voice session commences.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication device having a data application and a voice application, the method comprising:

establishing a data session between the data application and a data communication system, and during the data session, receiving a voice session request from a voice communication system into the voice application;

in response to the voice session request, alerting a user of the voice session request and transferring a voice session request indication from the voice application to the data application;

receiving a user acceptance of the voice session request, and in response to the user acceptance, transferring a voice session acceptance indication from the voice application to the data application;

in response to the voice session request indication and the voice session acceptance indication, transferring a data session message from the data application to the data communication system;

in response to transferring the data session message, transferring a data application ready indication from the data application to the voice application;

in response to both the user acceptance and the data application ready indication, transferring a voice session acceptance from the voice application to the voice communication system.

2. The method of claim 1 wherein transferring the data session message comprises identifying data session information for the data session message in response to the voice session request indication and transferring the data session message in response to the voice session acceptance indication.

3. The method of claim 1 wherein transferring the voice session acceptance in response to both the user acceptance and the data application ready indication comprises waiting for the data application ready indication after receiving the user acceptance and transferring the voice session acceptance after receiving the data application ready indication.

4. The method of claim 1 wherein alerting the user of the voice session request comprises prompting the user to accept the voice communication session and temporarily suspend the data session.

5. The method of claim 4 wherein the user acceptance of the voice session request comprises a user selection to accept the voice communication session and temporarily suspend the data session.

6. The method of claim 5 wherein the data session message comprises an instruction to temporarily suspend the data session.

7. The method of claim 1 wherein alerting the user of the voice session request comprises prompting the user to accept the voice communication session and terminate the data session.

8. The method of claim 7 wherein the user acceptance of the voice session request comprises a user selection to accept the voice communication session and terminate the data session.

9. The method of claim 8 wherein the data session message comprises an instruction to terminate the data session.

10. The method of claim 1 wherein establishing the data session and transferring the data session message comprises operating first communication circuitry to communicate over a first wireless communication link, and wherein receiving the voice session request and transferring the voice session acceptance comprises operating second communication circuitry to communicate over a second wireless communication link.

11. A communication device comprising:
a user interface;
a communication interface;
a memory that stores software;
processing circuitry configured to execute the software to provide a data application and a voice application to: establish a data session for the data application through the communication interface, and during the data session, receive a voice session request into the voice application through the communication interface, and in response to the voice session request, alert a user to the voice session request through the user interface and transfer a voice session request indication from the voice application to the data application, receive a user acceptance of the voice session request through the user interface, and in response to the user acceptance, transfer a voice session acceptance indication from the voice application to the data application, and in response to the voice session request indication and the voice session acceptance indication, transfer a data session message from the data application through the communication interface, and in response to transferring the data session message, transfer a data application ready indication from the data application to the voice application, and in response to both the user acceptance and the data application ready indication, transfer a voice session acceptance from the voice application through the communication interface.

12. The communication device of claim 11 wherein the processing circuitry is configured to identify data session information for the data session message in response to the voice session request indication and transfer the data session message in response to the voice session acceptance indication.

13. The communication device of claim 11 wherein the processing circuitry is configured to wait for the data application ready indication after receiving the user acceptance and transfer the voice session acceptance after receiving the data application ready indication.

14. The communication device of claim 11 wherein the alert for the voice session request comprises a prompt to the user to accept the voice communication session and temporarily suspend the data session.

15. The communication device of claim 14 wherein the user acceptance of the voice session request comprises a user selection to accept the voice communication session and temporarily suspend the data session.

16. The communication device of claim 15 wherein the data session message comprises an instruction to temporarily suspend the data session.

17. The communication device of claim 11 wherein the alert for the voice session request comprises a prompt to the user to accept the voice communication session and terminate the data session.

18. The communication device of claim 17 wherein the user acceptance of the voice session request comprises a user selection to accept the voice communication session and terminate the data session.

19. The communication device of claim 18 wherein the data session message comprises an instruction to terminate the data session.

20. The communication device of claim 11 wherein the communication interface comprises:
first communication circuitry configured to establish the data session and transfer the data session message over a first wireless communication link; and
second communication circuitry configured to receive the voice session request and transfer the voice session acceptance over a second wireless communication link.

* * * * *